United States Patent
Geliot et al.

(10) Patent No.: US 10,577,114 B2
(45) Date of Patent: Mar. 3, 2020

(54) ASSEMBLY FOR AN AIRCRAFT ENGINE MOUNTING COMPRISING AN ARTICULATION AXIS SUPPORTED BY A YOKE JOINT AND TRANSLATIONALLY IMMOBILE

(71) Applicant: Airbus Operations SAS, Toulouse (FR)

(72) Inventors: Jean Geliot, Toulouse (FR); Thomas Deforet, Toulouse (FR); Adeline Soulie, Verdun sur Garonne (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 16/253,040

(22) Filed: Jan. 21, 2019

(65) Prior Publication Data
US 2019/0241272 A1 Aug. 8, 2019

(30) Foreign Application Priority Data

Feb. 6, 2018 (FR) ...................................... 18 50974

(51) Int. Cl.
B64D 27/26 (2006.01)
F16C 11/06 (2006.01)
(Continued)

(52) U.S. Cl.
CPC .............. B64D 27/26 (2013.01); B64D 27/18 (2013.01); F16B 21/20 (2013.01); F16B 39/20 (2013.01);
(Continued)

(58) Field of Classification Search
CPC . B64D 27/26; B64D 2027/266; F16C 11/045; F16B 39/10; F16B 39/20; Y10T 403/32893
See application file for complete search history.

(56) References Cited

U.S. PATENT DOCUMENTS 4,889,458 A * 12/1989 Taylor ..................... F16B 21/10
411/383
4,943,013 A * 7/1990 Kapala ................... B64D 27/26
244/54
(Continued)

FOREIGN PATENT DOCUMENTS

FR 3014971 A1 6/2015
WO 2014154980 A1 10/2014

OTHER PUBLICATIONS

French Search Report; priority document.

Primary Examiner — Bradley Duckworth
(74) Attorney, Agent, or Firm — Greer, Burns & Crain, Ltd.

(57) ABSTRACT

An assembly for an aircraft engine mounting comprising an articulation axis supported by two plain bearings and a blocking device blocking the translation of the articulation axis in a direction which comprises a blocking screw that is screwed, in operation, into a first, tapped internal portion of a tubular extension secured to one of the two plain bearings, a first blocking system comprising an internal elastic stop ring housed in a groove formed in the tubular extension, and a second blocking system comprising a blocking screw which passes through first orifices passing through the second section of the blocking screw and second orifices passing through the tubular extension.

10 Claims, 2 Drawing Sheets

(51) Int. Cl.
  *B64D 27/18* (2006.01)
  *F16B 39/20* (2006.01)
  *F16C 11/04* (2006.01)
  *F16B 21/20* (2006.01)
  *F16M 1/04* (2006.01)

(52) U.S. Cl.
  CPC ........ *F16C 11/045* (2013.01); *F16C 11/0614* (2013.01); *F16C 11/0695* (2013.01); *F16M 1/04* (2013.01); *B64D 2027/262* (2013.01); *B64D 2027/266* (2013.01); *F16C 2226/60* (2013.01)

(56) References Cited

U.S. PATENT DOCUMENTS

| | | | |
|---|---|---|---|
| 6,150,656 A | 11/2000 | Garrity | |
| 8,740,136 B2 * | 6/2014 | Audart-Noel | B64D 27/26 244/54 |
| 9,004,871 B2 * | 4/2015 | Mishra | F16B 39/10 416/198 A |
| 9,399,520 B2 * | 7/2016 | Cassagne | B64D 27/26 |
| 9,527,599 B2 * | 12/2016 | Deforet | B64D 27/26 |
| 9,580,163 B2 * | 2/2017 | Sun | B64C 9/02 |
| 9,592,917 B2 * | 3/2017 | Cassagne | F02C 7/20 |
| 9,593,708 B2 * | 3/2017 | Cassagne | F16B 39/24 |
| 9,828,103 B2 * | 11/2017 | Cassagne | B64D 27/26 |
| 2015/0166190 A1 | 6/2015 | Cassagne et al. | |
| 2016/0076401 A1 | 3/2016 | Besnard et al. | |
| 2019/0161198 A1 * | 5/2019 | Combes | B64D 27/18 |
| 2019/0353197 A1 * | 11/2019 | Kassel | F01D 17/10 |

* cited by examiner

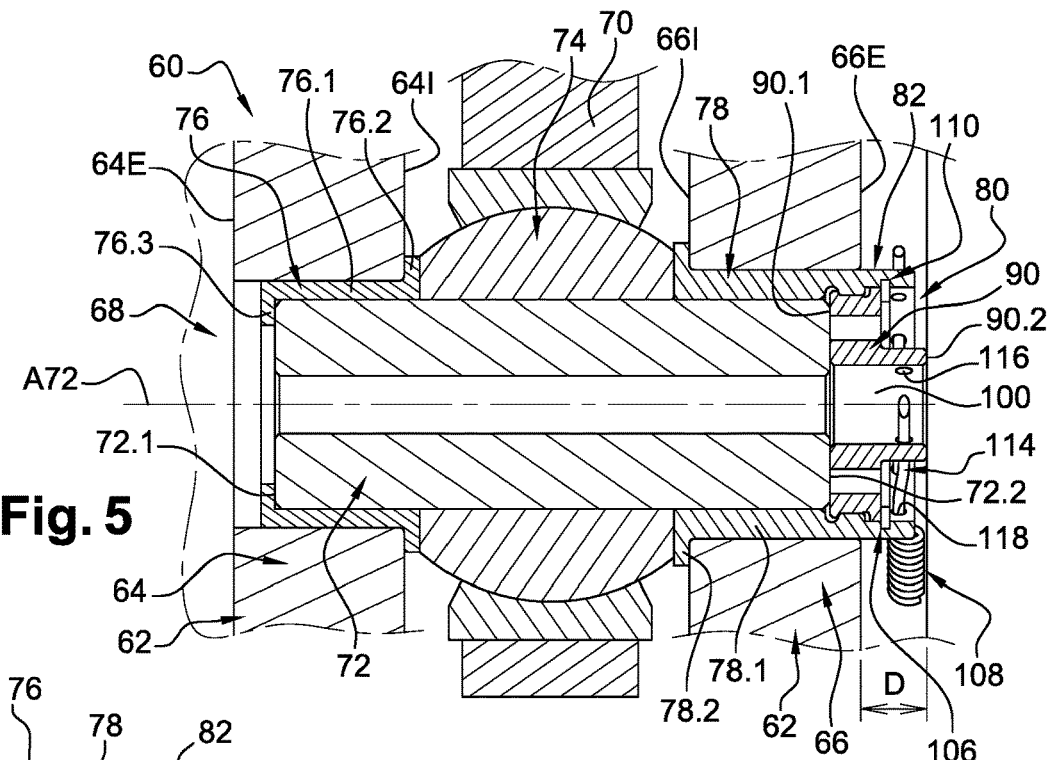
Fig. 5
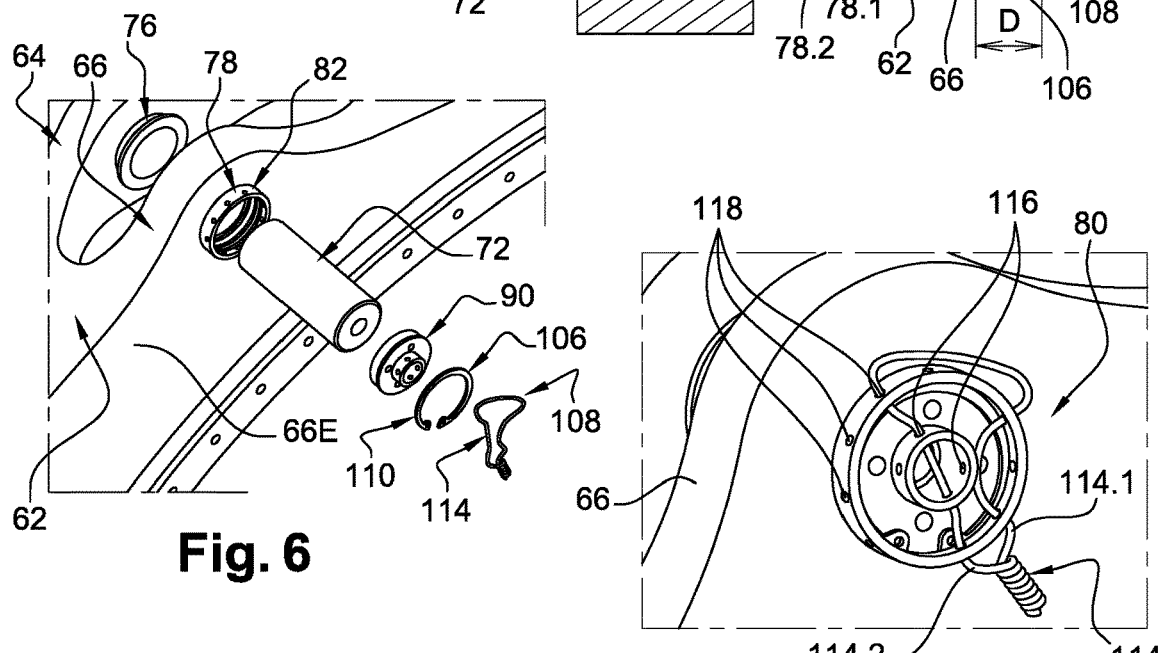
Fig. 6
Fig. 7
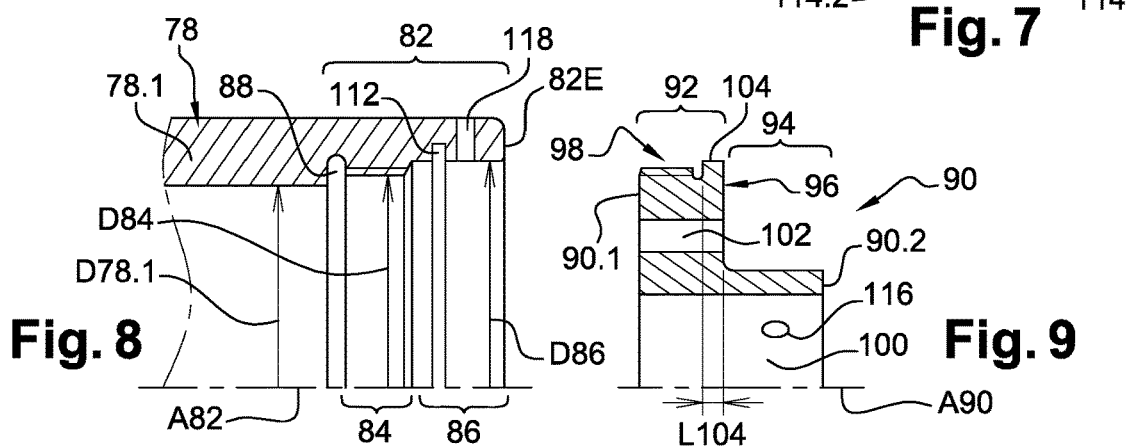
Fig. 8
Fig. 9

ASSEMBLY FOR AN AIRCRAFT ENGINE MOUNTING COMPRISING AN ARTICULATION AXIS SUPPORTED BY A YOKE JOINT AND TRANSLATIONALLY IMMOBILE

CROSS-REFERENCES TO RELATED APPLICATIONS

This application claims the benefit of the French patent application No. 1850974 filed on Feb. 6, 2018, the entire disclosures of which are incorporated herein by way of reference.

FIELD OF THE INVENTION

The present application relates to an assembly for an aircraft engine mounting comprising an articulation axis supported by a yoke joint and translationally immobile.

BACKGROUND OF THE INVENTION

According to a configuration visible in FIGS. 1 and 2, an aircraft 10 comprises several engine assemblies 12 which are positioned under the airfoil 14 of the aircraft 10.

An engine assembly 12 comprises an engine 16, a nacelle (not represented in FIG. 2) positioned around the engine 16 and a pylon 18 which ensures the link between the engine 16 and the rest of the aircraft 10, in particular the airfoil 14.

The pylon 18 comprises a primary structure 20 which is linked to the engine 16 by a front engine mounting 22, a rear engine mounting 24 and a pair of torque arms 26 which ensure the absorption of the thrust loads.

According to an embodiment visible in FIG. 3, the front engine mounting 22 comprises a plate 28, secured to the pylon 18, which has two yoke joints 30 arranged on either side of the pylon 18, and two links 32 which each link one of the yoke joints 30 of the plate 28 to a yoke joint 34 secured to a casing of the engine 16. Thus, each link 32 is linked to one of the yoke joints 30 of the plate 28 by a first articulation axis 36 and to one of the yoke joints 34 of the engine 16 by a second articulation axis 38.

According to an embodiment visible in FIG. 4 and described in detail in the document FR3014971, an assembly between the yoke joint 34 secured to the engine 16 and the link 32 comprises an articulation axis 38 mounted in a first plain bearing 40 inserted into a first branch 34.1 of the yoke joint 34 and into a second plain bearing 42 inserted into a second branch 34.2 of the yoke joint 34, the articulation axis 38 supporting, between the first and second branches 34.1 and 34.2, a ball joint 44 configured to link the link 32 and the articulation axis 38.

The first plain bearing 40 comprises, at a first end, an outer flange 40.1 configured to bear against an internal face 34.1I of the first branch 34.1 and, at a second end, a shoulder 40.2 configured to block the translation of the articulation axis 38 in a first direction. The second plain bearing 42 comprises, at a first end, an outer flange 42.1 configured to bear against an internal face 34.2I of the second branch 34.2.

The articulation axis 38 is a cylinder which has an axis A38, a first end face 38.1, substantially at right angles to the axis A38, configured to bear against the shoulder 40.2 of the first plain bearing 40 and a second end face 38.2 substantially at right angles to the axis A38.

The assembly also comprises a blocking device 46 configured to block the translation of the articulation axis 38 in a second direction which, associated with the shoulder 40.2, makes it possible to block the translation of the articulation axis 38.

The blocking device 46 comprises:

an extension 48 of the second plain bearing 42 which has a tapped internal bore 48.1 and notches 48.2, a blocking screw 50 that is screwed into the extension 48 which has a front face 50.1 bearing against the second end face 38.2 of the articulation axis 38 and a rear part 50.2 of hexagonal section making it possible to screw the screw 50, a lock washer 52 comprising an opening 52.1 which is fitted over the hexagonal rear part 50.2 of the screw 50 and two tongues 52.2, diametrically opposite, which are housed in notches 48.2 of the extension 48 to rotationally immobilize the screw 50 relative to the extension 48, an outer elastic stop ring 54 which is housed partially in an annular groove formed in the rear part 50.2 of the screw 50 making it possible to immobilize the lock washer 52 in the notches 48.2 of the extension 48, and a pin 56 which passes through the extension 48 and the rear part 50.2 of the screw 50 to rotationally immobilize the screw 50 relative to the extension 48.

This embodiment makes it possible to obtain a two-fold rotational blocking of the screw 50 relative to the extension 48. However, the blocking device 46 thus obtained generates an addendum D, relative to the outer face of the branch of the yoke joint, that is significant given the stacking of the lock washer 52, of the outer elastic stop ring 54 and of the pin 56.

The present invention aims to remedy the drawbacks of the prior art.

SUMMARY OF THE INVENTION

To this end, the subject of the invention is an assembly for an aircraft engine mounting comprising:

an articulation axis, a first plain bearing supporting the articulation axis, positioned in a first branch of a yoke joint and comprising an internal shoulder blocking the translation of the articulation axis in a first direction in operation, a second plain bearing supporting the articulation axis, positioned in a second branch of the yoke joint, comprising a tubular body and a tubular extension, said tubular extension having a first, tapped internal portion, a blocking device blocking the translation of the articulation axis in a second direction in operation which comprises:

a blocking screw, extending between a first end face against which the articulation axis bears in operation and a second end face, having a first section which adjoins the first end face and a second section which adjoins the second end face, the first section comprising a threading that is screwed in operation onto the first, tapped internal portion of the tubular extension, first and second blocking systems for immobilizing the blocking screw relative to the tubular extension.

According to an embodiment of the invention:

the first blocking system comprises an internal elastic stop ring and a groove, formed in the tubular extension, in operation partially housing the internal elastic stop ring, and the second blocking system comprises a blocking wire, first orifices passing through the second section of the blocking screw and second orifices passing through the tubular extension, the blocking wire in operation passing through the first and second orifices to ensure a blocking of the blocking screw relative to the tubular extension.

This arrangement makes it possible to obtain a more compact assembly, the addendum of the tubular extension being less great than for the prior art.

According to another feature, the internal elastic stop ring is inserted between the blocking screw and the second blocking system.

According to another feature, the blocking screw comprises a shoulder face, separating the first and second sections, substantially parallel to the first and second end faces, bearing in operation against the internal elastic stop ring.

According to another feature, the tubular extension comprises a smooth internal second portion, inserted between the first internal portion and an end of the tubular extension, which has an internal diameter greater than or equal to the internal diameter of the first internal portion.

According to an embodiment, the first section of the blocking screw comprises a flange having a diameter greater than the outer diameter of the first section and slightly less than the internal diameter of the second internal portion of the tubular extension, the flange being positioned at one end of the first section such that one of its lateral faces is arranged in the extension of the shoulder face.

According to another feature, the blocking wire comprises two ends linked to one another to ensure that it is held in the first and second orifices.

According to an embodiment, the two ends of the blocking wire are stranded.

According to another feature, the blocking screw comprises a through-hole, coaxial to the first and second sections, said through-hole extending between the first and second end faces.

According to another feature, the tubular extension comprises an internal groove positioned between the tubular body and the first internal portion, the internal groove having a bottom with a diameter greater than the internal diameter of the first internal portion.

Another subject of the invention is an aircraft comprising an assembly for an engine mounting according to one of the preceding features.

BRIEF DESCRIPTION OF THE DRAWINGS

Other features and advantages will emerge from the following description of the invention, a description given purely by way of example, in light of the attached drawings in which:

FIG. 5 is a cross section of an assembly of an engine mounting which illustrates an embodiment of the invention, FIG. 6 is an exploded perspective view of the assembly visible in FIG. 5, FIG. 7 is a view of an end of an articulation axis of the assembly visible in FIG. 5, FIG. 8 is a half cross-section of a tubular extension of a second plane bearing which illustrates an embodiment of the invention, and FIG. 9 is a half cross-section of a blocking screw which illustrates an embodiment of the invention.

DETAILED DESCRIPTION OF THE PREFERRED EMBODIMENTS

Figure 1:
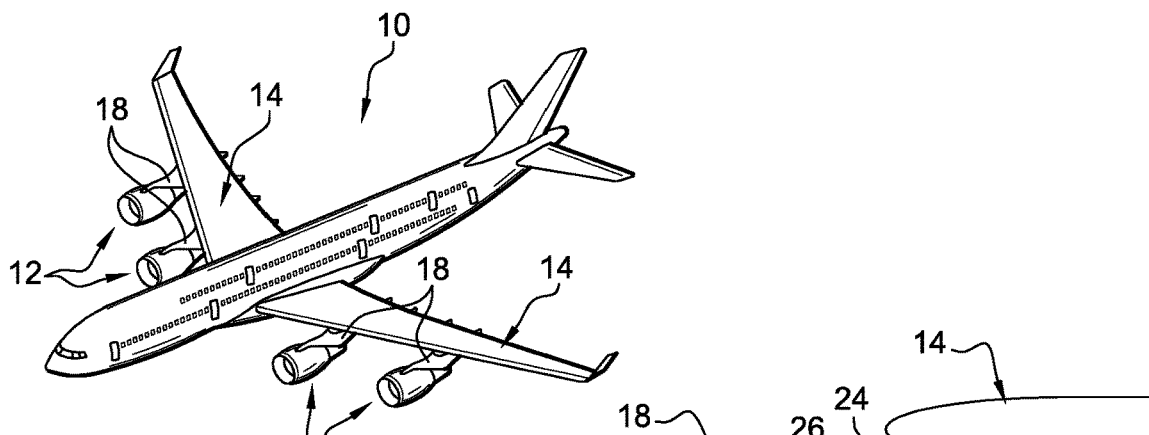
FIG. 1 is a perspective view of an aircraft.
Figure 2:
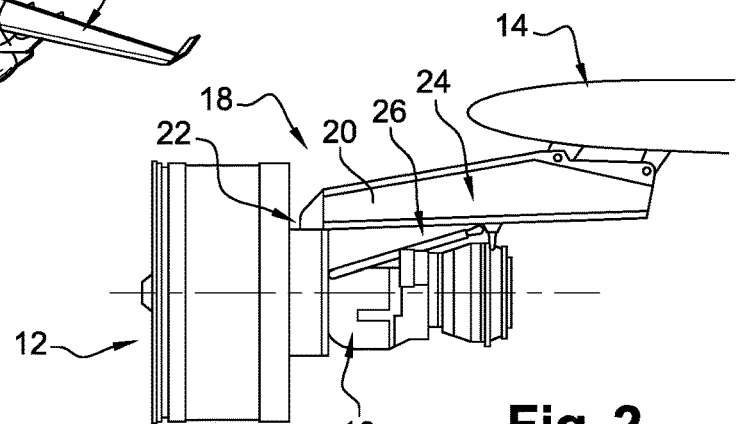
FIG. 2 is a schematic representation of a propulsive assembly linked to an airfoil which illustrates an embodiment of the prior art.
Figure 3:
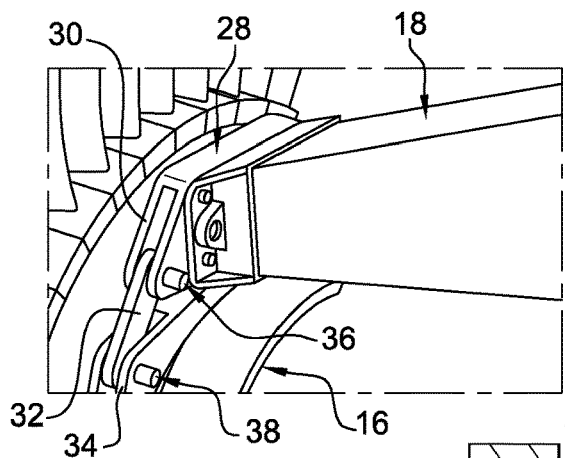
FIG. 3 is a perspective view of a front engine mounting which illustrates an embodiment of the prior art.
Figure 4:
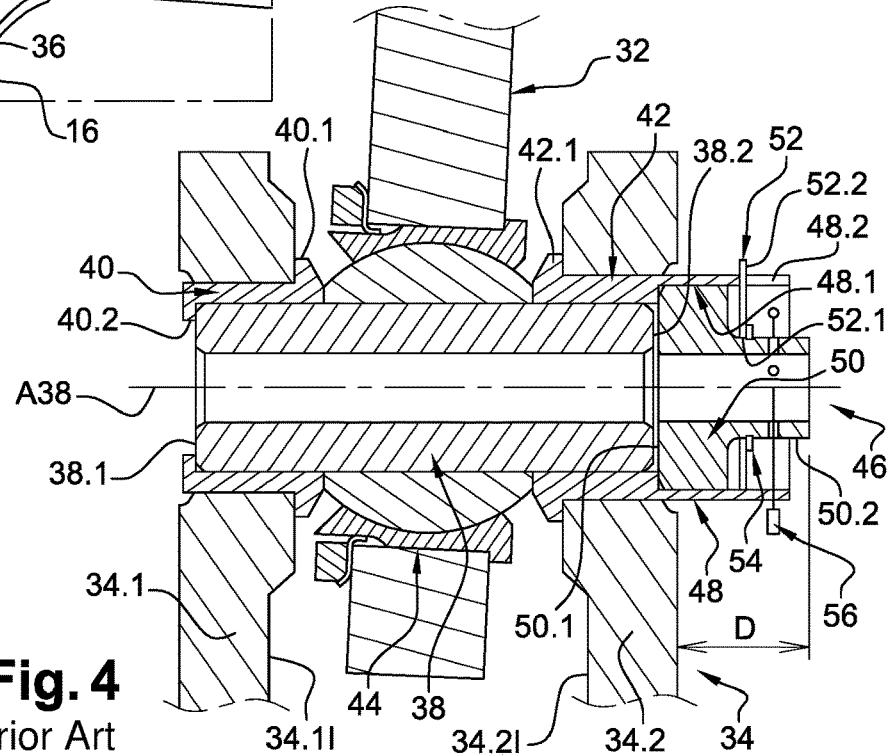
FIG. 4 is a cross section of an assembly of an engine mounting which illustrates an embodiment of the prior art.

According to an embodiment illustrated in FIG. 5, a part of a front engine mounting 60 comprises a yoke joint 62, secured to an aircraft engine (or one of its casings), having two, first and second branches 64, 66, linked by a link 68 to a connecting rod 70 which is itself linked to a primary structure of an aircraft pylon. The link 68 comprises an articulation axis 72, which supports, in the central part, a ball joint 74, linking the articulation axis 72 and the connecting rod 70, and first and second plain bearings 76, 78, arranged on either side of the ball joint 74, linking the articulation axis 72 and the branches 64, 66 of the yoke joint 62.

The first branch 64 comprises an internal face 64I, oriented towards the second branch 66, and an outer face 64E parallel to the internal face 64I. The second branch 66 comprises an internal face 66I, oriented towards the first branch 64, and an outer face 66E parallel to the internal face 66I. According to one configuration, the outer face 64E of the first branch 64 is difficult to access and the articulation axis 72 is introduced via the outer face 66E of the second branch 66.

The first branch 64 supports the first plain bearing 76 which has a tubular body 76.1, an outer flange 76.2 at a first end bearing in operation against the internal face 64I of the first branch 64 and an internal shoulder 76.3 configured to block the translation of the articulation axis 72 in a first direction.

The second branch 66 supports the second plain bearing 78 which has a tubular body 78.1 and an outer flange 78.2 at a first end bearing in operation against the internal face 66I of the second branch 66. The tubular body 78.1 comprises an internal diameter D78.1

The articulation axis 72 is a cylinder which has an axis A72, a first end face 72.1, substantially at right angles to the axis A72, bearing in operation against the internal shoulder 76.3 of the first plain bearing 76 and a second end face 72.2 substantially at right angles to the axis A72.

The assembly also comprises a blocking device 80 configured to block the translation of the articulation axis 72 in a second direction (opposite to the first direction) which, associated with the shoulder 76.3 of the first plain bearing 76, makes it possible to translationally immobilize the articulation axis 72.

Apart from the second plain bearing 78 and the blocking device 80, the other elements of the link 68 can be identical to those of the prior art previously described. Thus, this assembly can equally be mounted on the new engine mountings and on the existing ones.

Moreover, although described applied to a front engine mounting, the assembly of the invention can be used for the other engine mountings.

The second plain bearing 78 comprises a tubular extension 82 which has an end 82E and an outer diameter that is identical to that of the tubular body 78.1 of the second plain bearing 78. In operation, the tubular extension 82 protrudes relative to the outer face 66E of the second branch 66.

According to an embodiment visible in FIG. 8, the tubular extension 82 comprises a first, tapped internal portion 84 which adjoins the tubular body 78.1 and which has an internal diameter D84 greater than or equal to the internal diameter D78.1 of the tubular body 78.1, and a second, smooth internal portion 86, inserted between the first internal portion 84 and the end 82E of the tubular extension 82, which has an internal diameter D86 greater than or equal to the internal diameter D84 of the first internal portion 84. The first and second internal portions 84 and 86 are coaxial to an axis A82 which corresponds to the axis of the tubular extension 82.

According to a configuration, the tubular extension 82 comprises an internal groove 88 positioned between the tubular body 78.1 and the first internal portion 84, the internal groove 88 having a bottom with a diameter greater than the internal diameter D84 of the first internal portion 84.

The blocking device 80 comprises a blocking screw 90, extending between a first end face 90.1 and a second end face 90.2, having a first section 92 which adjoins the first end face 90.1 and a second section 94 which adjoins the second end face 90.2. The first and second sections 92 and 94 are coaxial to an axis A90 which corresponds to the axis of the blocking screw 90. In operation, the axis A90 of the blocking screw 90 coincides with the axis A82 of the tubular extension 82.

The first and second sections 92 and 94 are separated by a shoulder face 96 substantially parallel to the first and second end faces 90.1 and 90.2.

The first section 92 comprises a threading 98 configured to be screwed onto the first end, tapped internal portion 84 of the tubular extension 82.

As an indication, the first section 92 has an outer diameter substantially equal to twice that of the second section 94.

According to a configuration, the blocking screw 90 comprises a through-hole 100, coaxial to the first and second sections 92, 94, which extends between the first and second end faces 90.1, 90.2 and through-holes 102 parallel to the axis A90 of the blocking screw 90 which extend between the first end face 90.1 and the shoulder face 96. The through-holes 102 are configured to house spurs of a wrench in order to tighten the blocking screw 90. These through-holes 100 and 102 make it possible to reduce the weight of the blocking screw 90.

The first section 92 comprises a flange 104 which has a diameter greater than the outer diameter of the first section 92 and slightly less than the internal diameter D86 of the second internal portion 86 of the tubular extension 82. The flange 104 is positioned at an end of the first section 92 such that the shoulder face 96 of the blocking screw comprises one of the lateral faces of said flange 104.

The blocking device 80 comprises first and second blocking systems 106, 108 for immobilizing the blocking screw 90 relative to the tubular extension 82.

The first blocking system 106 comprises an internal elastic stop ring 110, also called internal circlip, and a groove 112, formed in the second internal section 86 of the tubular extension 82, in operation partially housing the internal elastic stop ring 110. In operation, the internal elastic stop ring 110 is inserted between the blocking screw 90 and the second blocking system 108, the shoulder face 96 bearing against the internal elastic stop ring 108. The groove 112 is separated from the first internal portion 84 by a distance substantially equal, to, or very slightly greater than, the width L104 of the flange 104. In operation, when the internal elastic stop ring 110 is partially housed in the groove 112, it translationally, and therefore rotationally, immobilizes the blocking screw 90. The lateral face of the flange 104 and the shoulder face 96 form a specific bearing for the elastic stop ring 110 in order for the latter not to be unseated in the event of accidental unscrewing of the blocking screw 90.

The second blocking system 108 comprises a blocking wire 114, first orifices 116 passing through the second section 94 of the blocking screw 90 and second orifices 118 passing through the second internal portion 86 of the tubular extension 82, the blocking wire 114 in operation passing through the first and second orifices 116 and 118 to ensure the blocking of the blocking screw 90 relative to the tubular extension 82.

According to a configuration, the second section 94 of the blocking screw 90 comprises six first orifices 116 distributed regularly over its periphery. The second internal portion 86 of the tubular extension 82 comprises ten second orifices 118 distributed regularly over its periphery.

According to a configuration, the blocking wire 114 passes through one of the second orifices 118 of the second internal portion 86 of the tubular extension 82, two first orifices 116, diametrically opposite, of the second section 94 of the blocking screw 90, then a second orifice 118 of the second internal portion 86 of the tubular extension 82.

To ensure that the blocking wire is held in the first and second orifices 116 and 118, the two ends 114.1 and 114.2 of the blocking wire 114 are linked to one another. According to a configuration, the ends 114.1 and 114.2 are stranded to ensure the linking thereof.

According to the invention, the blocking device 80 comprises only two blocking systems 106 and 108 in addition to the blocking screw 90, which makes it possible to reduce the addendum D of the tubular extension 82 relative to the outer face 66E of the second branch 66. Thus, a more compact assembly is obtained.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An assembly for an aircraft engine mounting comprising:
   an articulation axis,
   a first plain bearing supporting the articulation axis, positioned in a first branch of a yoke joint and comprising an internal shoulder blocking a translation of the articulation axis in a first direction in operation,
   a second plain bearing supporting the articulation axis, positioned in a second branch of the yoke joint, comprising a tubular body and a tubular extension, said tubular extension having a first, tapped internal portion,
   a blocking device blocking the translation of the articulation axis in a second direction in operation which comprises:
      a blocking screw, extending between a first end face against which the articulation axis bears in operation and a second end face, having a first section which adjoins the first end face and a second section which adjoins the second end face, the first section comprising a threading that is screwed in operation onto the first, tapped internal portion of the tubular extension, first and second blocking systems for immobilizing the blocking screw relative to the tubular extension, wherein the first blocking system comprises an internal elastic stop ring and a groove, formed in the tubular extension, in operation partially housing the internal elastic stop ring, and wherein the second blocking system comprises a blocking wire, first orifices passing through the second section of the blocking screw and second orifices passing through the tubular extension, the blocking wire in operation passing through the first and second orifices to ensure a blocking of the blocking screw relative to the tubular extension.

2. The assembly for an aircraft engine mounting according to claim 1, wherein the internal elastic stop ring is inserted between the blocking screw and the second blocking system.

3. The assembly for an aircraft engine mounting according to claim 1, wherein the blocking screw comprises a shoulder face, separating the first and second sections, substantially parallel to the first and second end faces, bearing in operation against the internal elastic stop ring.

4. The assembly for an aircraft engine mounting according to claim 3, wherein the tubular extension comprises a smooth internal second portion, inserted between the first internal portion and an end of the tubular extension, which has an internal diameter greater than or equal to an internal diameter of the first internal portion.

5. The assembly for an aircraft engine mounting according to claim 4, wherein the first section of the blocking screw comprises a flange having a diameter greater than an outer diameter of the first section and slightly less than the internal diameter of the second internal portion of the tubular extension, the flange being positioned at one end of the first section such that one of its lateral faces is arranged in an extension of the shoulder face.

6. The assembly for an aircraft engine mounting according to claim 1, wherein the blocking wire comprises two ends linked to one another to ensure that the blocking wire is held in the first and second orifices.

7. The assembly for an aircraft engine mounting according to claim 6, wherein the two ends of the blocking wire are stranded.

8. The assembly for an aircraft engine mounting according to claim 1, wherein the blocking screw comprises a through-hole, coaxial to the first and second sections, said through-hole extending between the first and second end faces.

9. The assembly for an aircraft engine mounting according to claim 1, wherein the tubular extension comprises an internal groove positioned between the tubular body and the first internal portion, the internal groove having a bottom with a diameter greater than an internal diameter of the first internal portion.

10. An aircraft comprising an assembly for an engine mounting according to claim 1.

* * * * *